(12) United States Patent
Zhu et al.

(10) Patent No.: US 8,726,813 B2
(45) Date of Patent: May 20, 2014

(54) HONEYCOMB TABLE

(75) Inventors: Jianqiang Zhu, Shanghai (CN); Taiying Zeng, Shanghai (CN); Fang Liu, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 0 days.

(21) Appl. No.: 13/597,247

(22) Filed: Aug. 28, 2012

(65) Prior Publication Data

US 2013/0104780 A1 May 2, 2013

(30) Foreign Application Priority Data

Oct. 26, 2011 (CN) .......................... 2011 1 0330258

(51) Int. Cl.
*A47B 37/00* (2006.01)
(52) U.S. Cl.
USPC .................................................. 108/28
(58) Field of Classification Search
USPC ......... 108/26.2, 24–26, 28; 428/116; 248/637
See application file for complete search history.

(56) References Cited

U.S. PATENT DOCUMENTS

| | | | | |
|---|---|---|---|---|
| 877,770 A | * | 1/1908 | Champeny et al. | ............... 4/653 |
| 1,875,377 A | * | 9/1932 | Hanson | ......................... 312/232 |
| 2,833,317 A | * | 5/1958 | Johnson | ......................... 141/270 |
| 3,627,246 A | * | 12/1971 | Widding et al. | ........... 248/188.8 |
| 4,035,535 A | * | 7/1977 | Taylor | ......................... 428/116 |
| 4,621,006 A | | 11/1986 | Terry et al. | |
| 4,645,171 A | * | 2/1987 | Heide | ............................ 248/637 |
| 4,853,065 A | | 8/1989 | Terry et al. | |
| 5,021,282 A | * | 6/1991 | Terry et al. | .................... 428/116 |
| 5,061,541 A | | 10/1991 | Gertel | |
| 5,402,734 A | * | 4/1995 | Galpin et al. | .................... 108/28 |
| 7,739,962 B2 | * | 6/2010 | Zhu et al. | ......................... 108/28 |
| 2004/0134392 A1 | * | 7/2004 | Sargeant et al. | ........... 108/57.34 |
| 2007/0144409 A1 | * | 6/2007 | Zhu et al. | ......................... 108/28 |
| 2013/0186707 A1 | * | 7/2013 | Richter | ......................... 181/292 |

FOREIGN PATENT DOCUMENTS

CN 200510112023 7/2008

* cited by examiner

*Primary Examiner* — Janet M Wilkens
(74) *Attorney, Agent, or Firm* — Manni Li; Mei & Mark LLP

(57) ABSTRACT

A honeycomb table, including an upper skin tapped with holes for mounting equipments, a lower skin with a plurality of holes, a honeycomb core layer, connecting side walls, a number of cups and funnels in honeycomb core cells one-to-one. The cups are positioned on the holes in the lower skin. The cups and funnels prevent contaminants and residue from reaching the interior of the honeycomb core, such that the honeycomb can be continuously maintained in a clean working condition.

13 Claims, 7 Drawing Sheets

HONEYCOMB TABLE

CROSS-REFERENCE TO RELATED APPLICATIONS

Pursuant to 35 U.S.C. §119 and the Paris Convention Treaty, this application claims the benefit of Chinese Patent Application No. 201110330258.4 filed Oct. 26, 2011, the contents of which are incorporated herein by reference.

BACKGROUND OF THE INVENTION

1. Field of the Invention

The invention relates to optics and fine mechanics, and more particularly to an easily cleaned honeycomb table.

2. Description of the Related Art

Honeycomb tabletops are typically used for supporting and positioning highly sensitive scientific equipment, such as optical devices. Such systems generally include an upper skin, a lower skin, a honeycomb core, and a connecting side wall. The upper skin is typically provided with a plurality of tapped holes which are used for mounting equipment upon the tabletop surface. The honeycomb core maintains the structure rigidity and flatness of the upper skin to minimize displacement of the devices relative to one another.

Unfortunately, the tapped holes in the upper skin provide access to the cells of the honeycomb core in the interior of the table. Thus liquid or other debris spilled upon the table surface may enter the interior. Due to the boned structure of the honeycomb and the complexity of the interior structure, such spills are difficult and impractical to clean. At last, the tabletop cannot satisfy the needs of usage and contaminate clean rooms.

Various methods of construction are known to solve these problems. Specifically, in China, ZL200510112023 discloses a solution to add tubes in honeycomb cores. The shortcoming of this method adds the honeycomb table weight highly.

U.S. Pat. No. 4,621,006 discloses a tabletop design in which a sealing sheet is positioned between a first distance honeycomb core portion adjoining the lower layer and a second distance several times honeycomb core portion adjoining the upper skin. The second distance is several times of the mentioned first distance, so that the honeycomb core portion adjoining the lower layer is sealed off by the sealing sheet, only a smaller distance honeycomb core portion need be cleaned.

U.S. Pat. No. 4,645,171 discloses a honeycomb optical table wherein each hole in the top surface is sealed off from interior of the honeycomb cells by a cavity enclosure which is secured to the underside of the top skin in registration with each hole. The cavity enclosures prevent residue and contaminant from passing to the interior of the honeycomb core. As a result, cleanup can be effectively accomplished by wiping the table surface and using suction the small enclosure.

In U.S. Pat. No. 4,853,065 and U.S. Pat. No. 5,021,282, the use of a sealing sheet with projections corresponding in number and location to apertures in the table leavers and projecting into cells of honeycomb cores for a distance being several times smaller than the depth of such cores. It provides means of sealing the holes of the upper layer from the honeycomb core.

U.S. Pat. No. 5,061,541 discloses a honeycomb optical table wherein at least a layer of rigid corrugated material including valleys and crests, the internal stiffening sheet, the drilled and tapped bar, and the series of connected cups to seal off from interior of the honeycomb cells which is secured to the underside of the top skin. The longitudinal axes of the crests and valleys of the rigid corrugated material are aligned generally parallel to the both facing sheets and perpendicular to the longitudinal axes of the cells of honeycomb core.

U.S. Pat. No. 5,402,734 discloses a honeycomb optical table in which a number of cups are positioned between the bottom layer and the top layer, and at least some of the number of cups are sized and shaped to cooperate with the lower face of the top layer to form a cavity surrounding at least two of the plurality of holes in the top layer so that contaminants are unable to pass through the surrounded holes into the honeycomb core.

Another optical table is provided in U.S. Pat. No. 7,739,962, in which many tubes are positioned between the interior of upper and lower skins to connect the holes on the both skins so that contaminants and residue are unable to enter the interior of the honeycomb core.

Although above-mentioned varying levels of effectiveness in containing the contaminants and spills easily, and isolating from residue or contaminants entering the interior of the tabletop, few existing design appears to adequately address the need of easy and thorough cleaning of the portion of the tabletop exposed to the tapped holes. If any, the tabletop will lose weight. In this invention, a honeycomb table is disclosed with an easily clean structure by using downwards tread of object in field of gravity. Spillage, contaminants, and residue can be more easily get out by the holes of lower skin or collect in the cup above the holes.

SUMMARY OF THE INVENTION

In view of the above-described problems, it is one objective of the invention to provide a honeycomb table. Specifically, the invention provides a tabletop constructed in such way that spillage and contaminants may be easily cleaned from the tabletop and spills will not enter the interior of tabletop, meanwhile the weight of table would not add or only add slightly.

To achieve the above objective, in accordance with one embodiment of the invention, there is provided a honeycomb table comprising an upper skin with tapped holes for mounting equipment, a honeycomb core layer, a connecting side wall, a lower skin with a plurality of holes which have one-to-one relationship with honeycomb core cells, and a number of funnels in the honeycomb core cells one-to-one.

In a class of this embodiment, the honeycomb table comprises the lower skin with a plurality of holes. The hole is a through hole, tapped hole, or a mixture thereof. The diameter of the hole is greater than the diameter of the tapped hole in the upper skin.

In a class of this embodiment, the honeycomb table comprises cups. These cups are made from chemically resistant nylon or similar material, and they are put on and fixed with the holes in the lower skin with magnitude of interference.

In a class of this embodiment, the honeycomb table comprises some of cups. The length of the cup can equal to or be shorter than the depth of the hole in the lower skin.

In a class of this embodiment, the honeycomb table comprises some of funnels. The lower limbs of the funnels connect with the top end of the holes in the lower skin, and the upper limbs of funnels are fixed with the inner wall of the honeycomb core cells one to one.

In a class of this embodiment, the honeycomb table comprises some of funnels. These funnels are made from chemically resistant nylon or similar material.

In a class of this embodiment, the projection of the sidewall section of the funnel is a straight line or a curve.

Advantages of the invention are summarized below. The interior honeycomb core of the honeycomb table of the invention prevents the entry of the substances from settling in the core and other similar structures with a long time. The holes in the lower skin and funnels in the honeycomb core cells help contaminant drop down easily from the top. Moreover the small cups covering on the lower skin holes can contain the residue momentarily and prevent the dust from entering into the honeycomb core. In needful time, the small cups take off and water cleanup can be accomplished. The design of the honeycomb table provides to clean the table rapidly without weakening the rigidity of the honeycomb table.

DETAILED DESCRIPTION OF THE EMBODIMENTS

Figure 1:
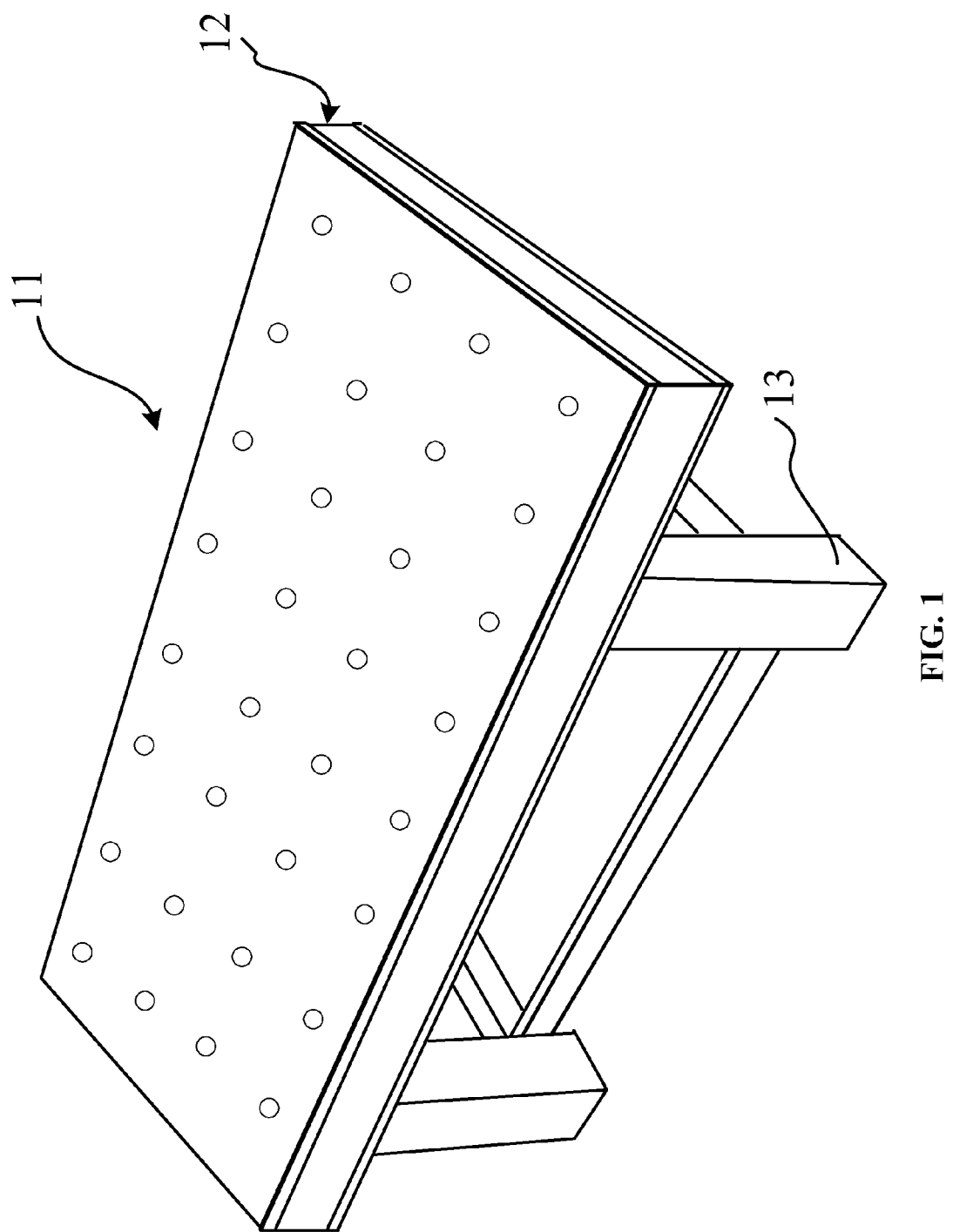
FIG. 1 is a perspective view of a honeycomb table according to one embodiment of the invention.

As shown in FIG. 1, a honeycomb table 11 is used to support laboratory equipment. The table comprises a honeycomb tabletop 12 and some vibration isolation supports 13.

Figure 2:
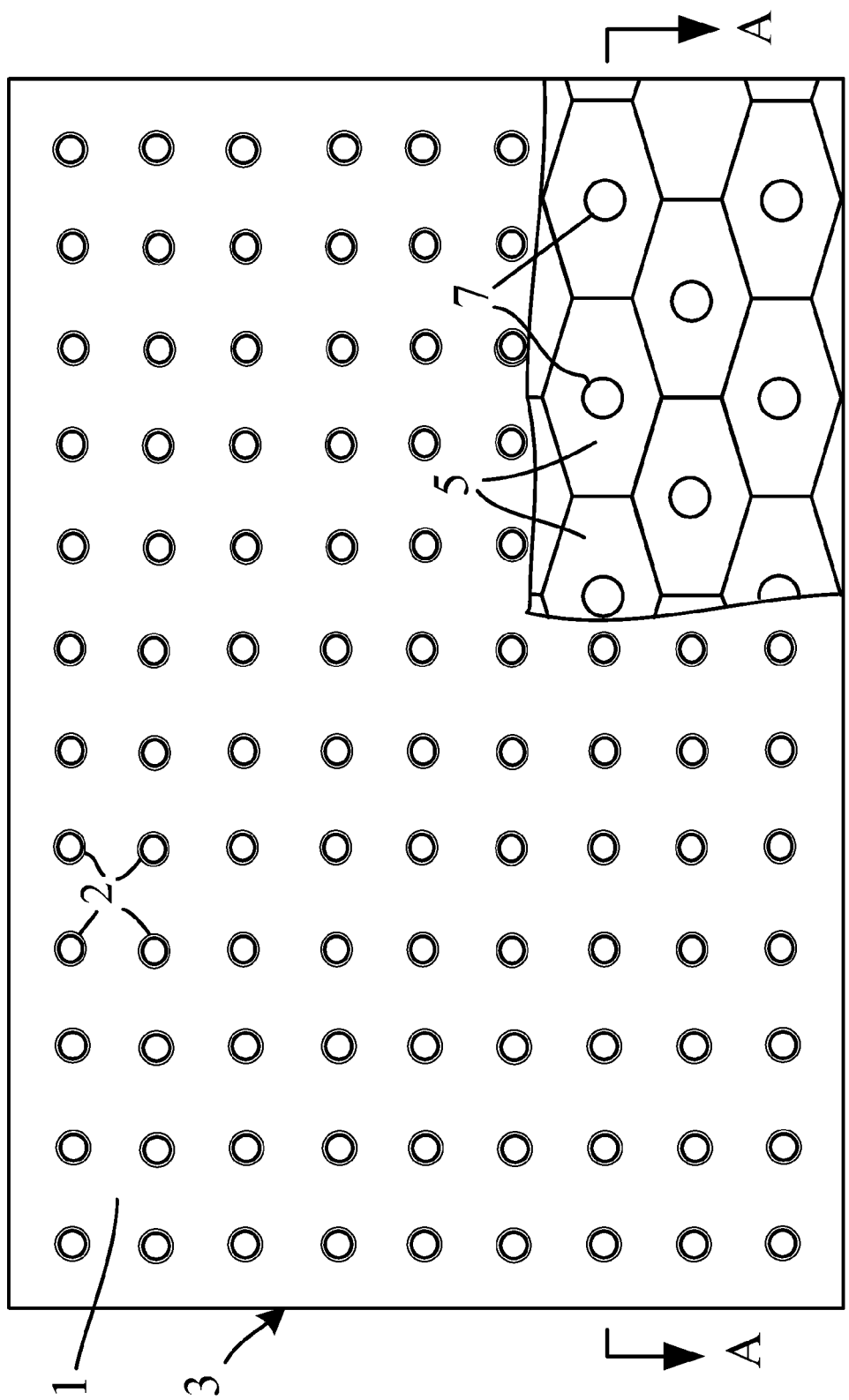
FIG. 2 is a plan view of a tabletop with parts broken away to disclose internal structure according to one embodiment of the invention.
Figure 3:
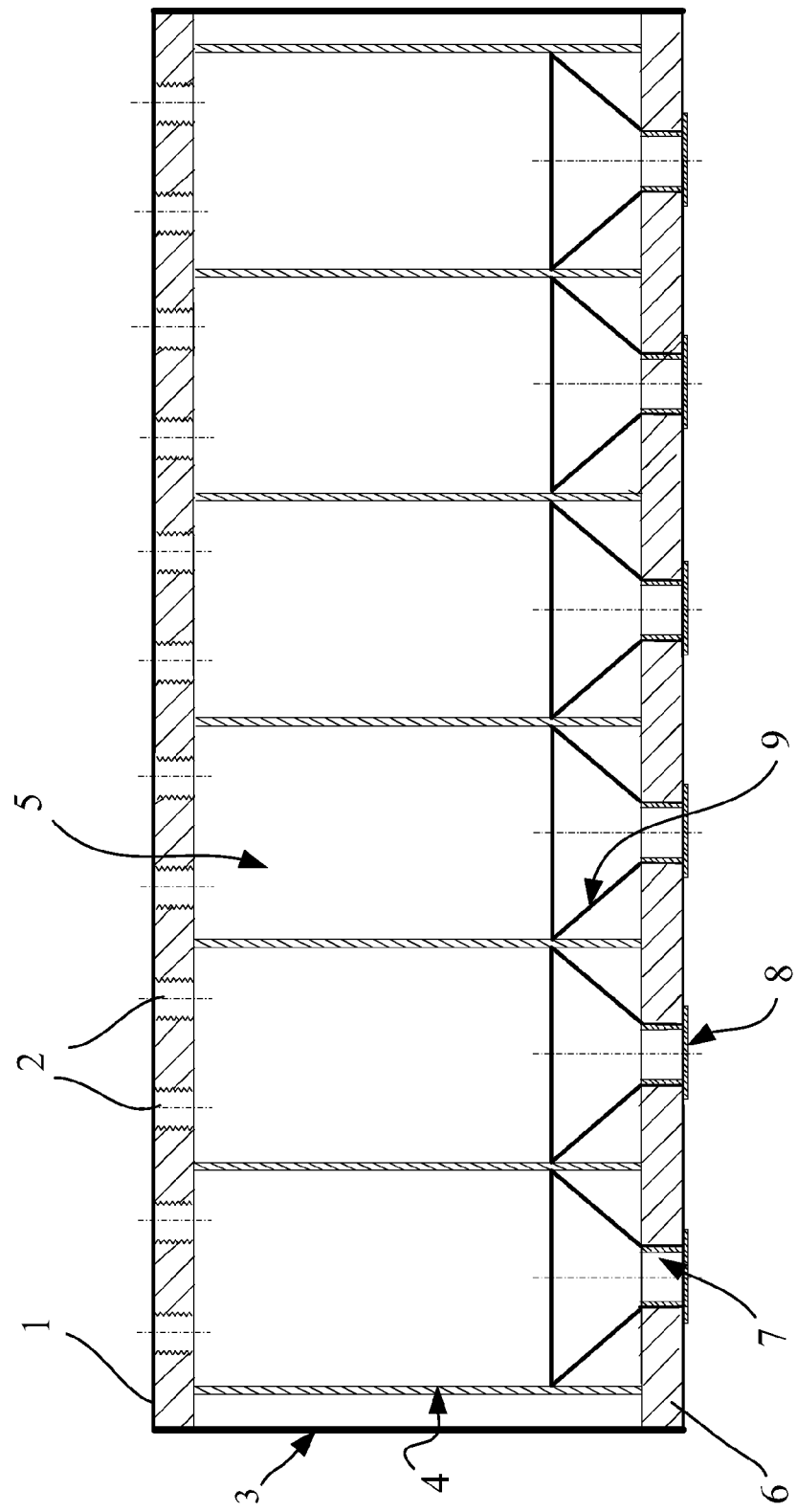
FIG. 3 is a side sectional view of a tabletop of an exemplary embodiment in FIG. 2.

As shown in FIGS. 2 and 3, the honeycomb tabletop 12 comprises an upper skin 1 having a plurality of tapped holes 2 used for mounting equipment upon the honeycomb tabletop 12. The honeycomb tabletop 12 also has a lower skin 6 with holes 7, a connecting side wall 3, and some of funnels 9 in honeycomb core cells 5. Together with the upper skin 1, the lower skin 6 defines a honeycomb core layer 4. Within the honeycomb core layer 4 are placed a plurality of honeycomb core cells 5. Additional internal damping material (not shown in this drawing) may be incorporated to minimizing the normal tabletop flexural modes vibration and other induced vibration.

The lower skin 6 is disposed with a plurality of holes 7. The holes 7 are through holes, tapped holes, or a mixture thereof. The holes in the lower skin 6 can provide for mounting the vibration isolation supports 13. The diameters of the holes 7 are greater than the diameters of the tapped holes 2 in the upper skin 1.

Figure 5A:
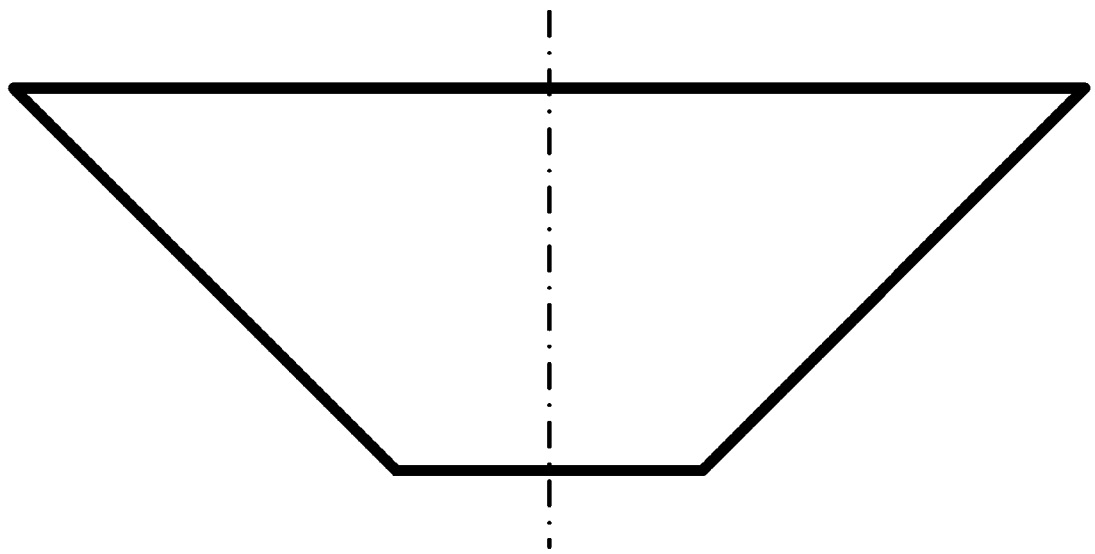
FIG. 5A is an alternative embodiment of FIG. 3 with some of funnels in honeycomb cells.
Figure 5B:
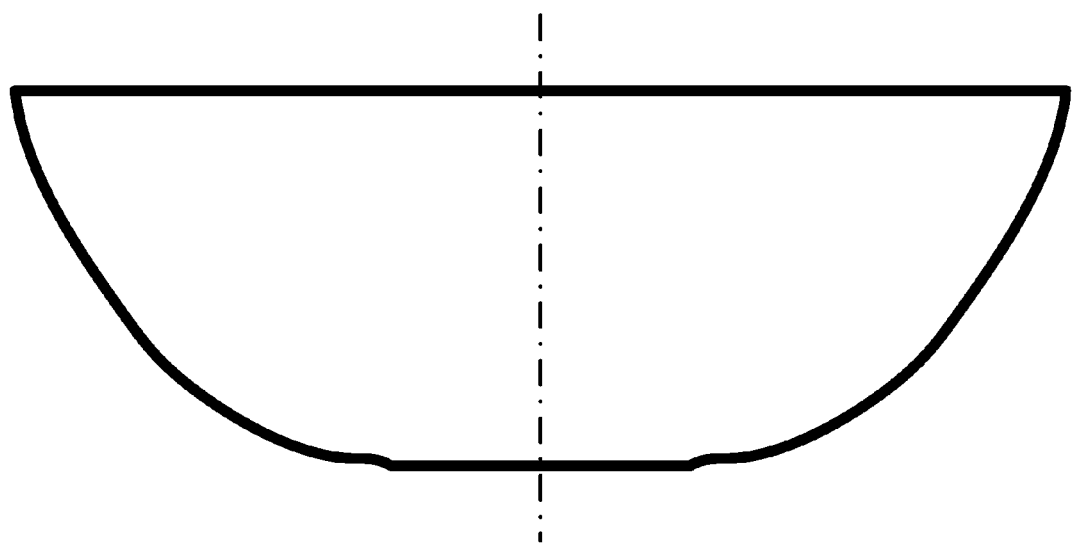
FIG. 5B is an alternative embodiment of FIG. 5A.

The funnels 9 are disposed in the honeycomb core cells 5. As shown in FIG. 3, each of the funnels 9 has an upper limb with a top rim and a lower limb with a bottom rim, and each of the funnels is inside the honeycomb core cells with the top rim of the upper limb situated at a distance away from the tapped holes of the upper skin. The lower limbs of the funnels 9 connect with the top end of the holes 7 in the lower skin 6, and the upper limbs of the funnels 9 fix on the inner wall of the honeycomb core cells 5. The funnels 9 are made from chemically resistant nylon or similar material. The projections of the sidewall sections of the funnels 9 are straight lines or curves. The funnels 9 can be conical funnels as shown in FIG. 5a or bowl-shaped funnels as shown in FIG. 5b.

Figure 4A:
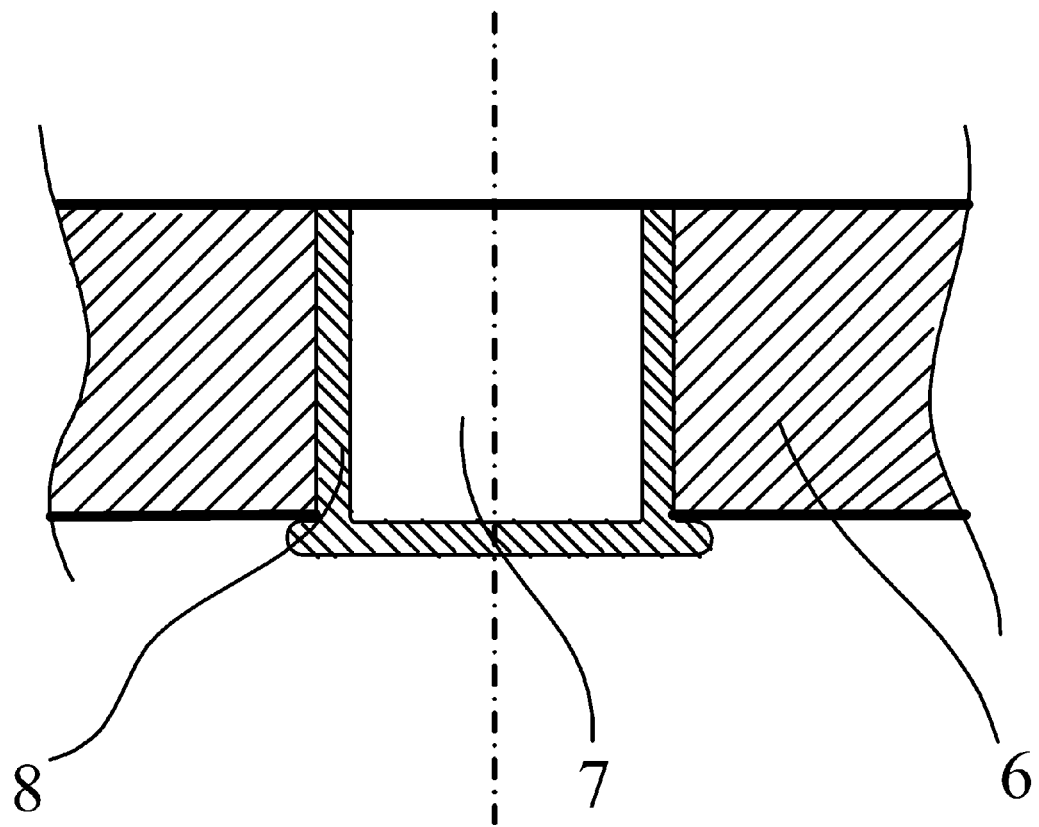
FIG. 4A is an alternative embodiment of FIG. 3 with some of small cups on holes.
Figure 4B:
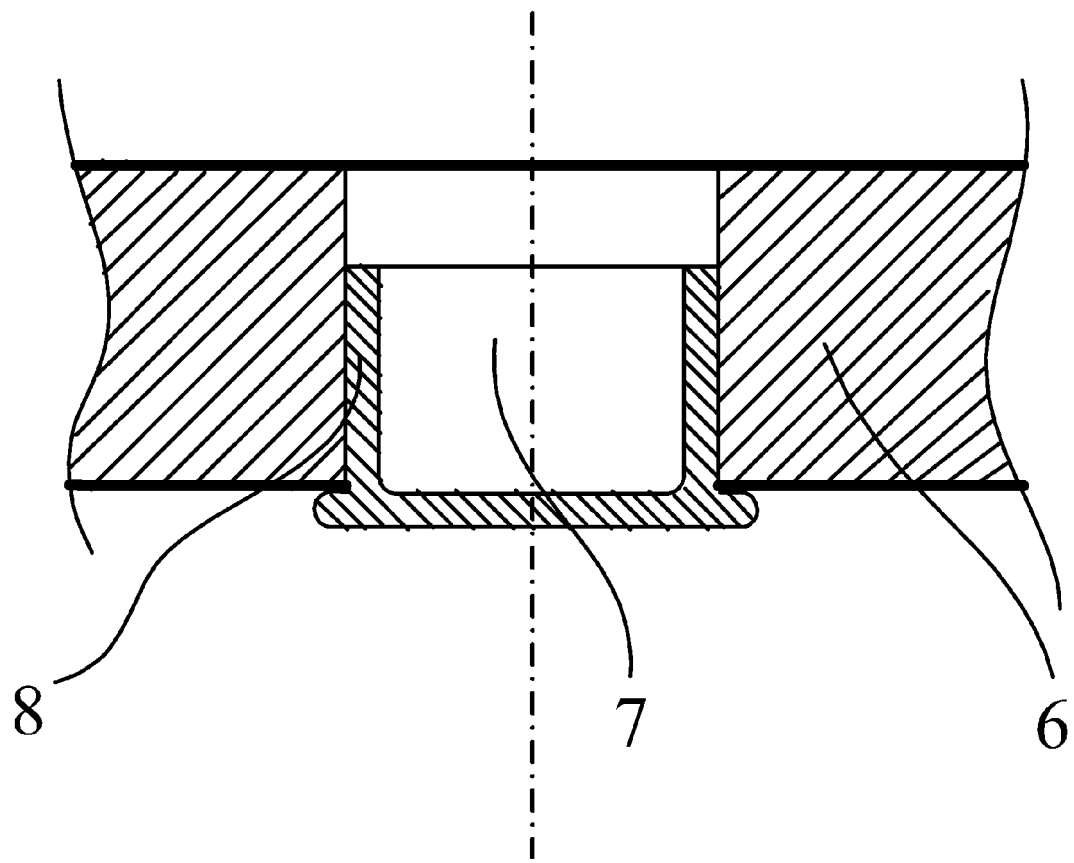
FIG. 4B is another alternative embodiment of FIG. 4A.

As shown in FIGS. 4A and 4B, alternative embodiments of the honeycomb table comprise an upper skin 1 and a lower skin 6, a honeycomb core layer 4, a connecting side wall 3, some funnels 9 in honeycomb core cells 5, and some small cups 8. The small cups 8 made from chemically resistant nylon or similar material are fixed into the holes 7 with magnitude of interference. The length of the cups 8 can equal to or be shorter than the depths of the holes 7 in the lower skin 6, or extend into the honeycomb core cells 5 even to get to the interior of the upper skin 1.

Various modifications may be made in the foregoing description without departing from the scope of the invention. It is intended that all matter contained in the above description and depicted in the accompanying drawings be construed in an illustrative and not in limiting sense.

The invention claimed is:

1. A honeycomb table, comprising:
a tabletop having
an upper skin comprising tapped holes for mounting equipments,
a lower skin having a plurality of holes,
a honeycomb core layer having a plurality of honeycomb core cells between the upper skin and the lower skin, each of the honeycomb core cells having an inner wall,
a side wall connecting the upper skin and the lower skin;
a plurality of funnels inside the honeycomb core cells, each of the funnels having an upper limb with a top rim and a lower limb with a bottom rim, and the top rim of the upper limb being situated at a distance away from the tapped holes of the upper skin; and
small cups, each of the small cups covering on said holes in the lower skin,
wherein each of the holes of the lower skin is perforating line boring to the honeycomb core cells and having one-to-one relation to the honeycomb core cell.

2. The honeycomb table of claim 1, wherein said holes in the lower skin are through holes, tapped holes, or a mixture thereof, and said holes in the lower skin provide for mounting vibration isolation supports.

3. The honeycomb table of claim 1, wherein diameter of said holes in the lower skin is greater than diameter of said tapped holes in the upper skin.

4. The honeycomb table of claim 1, wherein the bottom rim of the lower limbs of said funnels connect with top of the holes in the lower skin, and the top rim of the upper limbs of the funnels are fixed on inner walls of the honeycomb core cells.

5. The honeycomb table of claim 1, wherein said funnels are conical funnels or bowl-shaped funnels.

6. The honeycomb table of claim 1, wherein said funnels are made from chemically resistant material.

7. The honeycomb table of claim 1, wherein a length of said small cups equals to or is shorter than depth of the holes in the lower skin.

8. The honeycomb table of claim 1, wherein said small cups are made from chemically resistant material.

9. The honeycomb table of claim 1, wherein said small cups are assembled to said holes with magnitude of interference.

10. The honeycomb table of claim 1, wherein each of the funnels is inside one of the honeycomb cells.

11. The honeycomb table of claim 10, wherein each of the honeycomb cell has one funnel.

12. The honeycomb table of claim 10, wherein some of the honeycomb cells do not have the funnel inside.

13. The honeycomb table of claim 1, wherein each of the honeycomb cells and funnels therein corresponds to two or more tapped holes of the upper skin.

* * * * *